United States Patent [19]

Millward

[11] 3,976,832

[45] Aug. 24, 1976

[54] CIRCUIT FOR DETECTING VERTICAL MIS-REGISTRATION IN A FLYING SPOT SCANNER

[75] Inventor: John David Millward, Hitchin, England

[73] Assignee: The Rank Organisation, Limited, London, England

[22] Filed: July 30, 1975

[21] Appl. No.: 600,426

[30] Foreign Application Priority Data

July 31, 1974 United Kingdom............... 22694/74

[52] U.S. Cl............................ 178/6.8; 178/DIG. 28; 178/DIG. 29
[51] Int. Cl.²........................................... H04N 3/36
[58] Field of Search........ 178/6.8, DIG. 28, DIG. 29

[56] References Cited
UNITED STATES PATENTS

| | | | |
|---|---|---|---|
| 3,767,852 | 10/1973 | Horowitz ...................... | 178/DIG. 28 |
| 3,778,545 | 12/1973 | Metzger ....................... | 178/DIG. 28 |
| 3,806,645 | 4/1974 | Faureau ........................ | 178/DIG. 28 |

*Primary Examiner*—Howard W. Britton
*Assistant Examiner*—Michael A. Masinick
*Attorney, Agent, or Firm*—Brisebois & Kruger

[57] ABSTRACT

This invention concerns a circuit for detecting vertical mis-registration in a flying spot scanner of the kind in which each film frame is scanned by at least two interlaced fields.

For proper vertical registration each line of each field should fall midway between two adjacent lines of the other field. This means that, on average, the mean video signal value of each line of one field should equal the mean video signal value of the two adjacent lines of the other field.

Our invention detects whether this is so by forming the difference between the means video signal values of each line of one field with that of the two adjacent lines of the other field, and summing over a number of lines.

6 Claims, 3 Drawing Figures

CIRCUIT FOR DETECTING VERTICAL MIS-REGISTRATION IN A FLYING SPOT SCANNER

This invention relates to a circuit for providing an error signal indicative of vertical mis-registration in a flying spot scanner in which each film frame is scanned by at least two interlaced fields.

The invention is applicable to flying spot film scanners where the scan is moved to follow the motion of the film. In such scanners the film is moved continuously by the projector and since each film frame has to be scanned twice or three times depending upon the television standard, the raster is displaced in a vertical direction on the cathode ray tube to follow the film movement.

If the displacement between the two or three positions of the raster is not correct a registration error becomes apparent to the viewer. It is an object of the invention to detect such an error.

According to the invention there is provided a circuit for providing an error signal indicative of vertical mis-registration in a flying spot scanner in which each film frame is scanned by at least two interlaced fields, the circuit comprising first means for forming in respect of each plurality of lines in one field a signal representative of the difference between the mean video signal value of each said line and the mean video signal value of the respective two immediately adjacent lines in the other field, second means for selectively reversing the sign of each difference signal when a predetermined one of the two immediately adjacent lines has a greater individual mean video signal value than the other, and third means for forming the sum of the difference signals for the plurality of lines in the one field.

The vertical registration error is only of importance and detectable when there is a change of information in the vertical direction. Therefore the circuit determines whether a vertical transition is smooth or irregular. If smooth, no difference signal will be obtained and therefore no error assumed. If irregular, a difference signal will be obtained which will be positive or negative depending on whether the positional error is high or low. Some horizontal patterns could give a difference signal with zero registration error. Therefore, the difference signals are summed for a plurality of lines, and preferably a whole field, so that any patterning errors which could be positive or negative would only be a small proportion of the registration error.

An embodiment of the invention will now be described by way of example, with reference to the accompanying drawings, in which.

Figure 1:
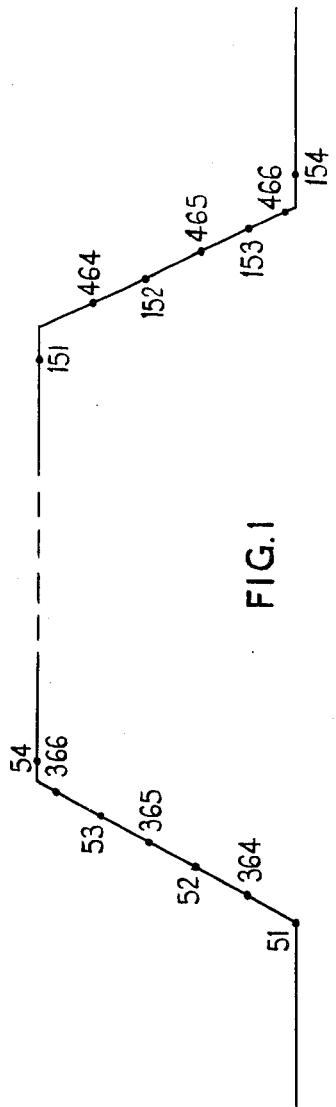
FIG. 1 represents a positive and negative transition in the vertical direction of a picture being scanned by a flying spot scanner.

FIG. 1 shows a positive and negative transition in the vertical direction of the picture. The full line represents a change in density of the film itself and the dots represent the raster lines superimposed on the picture. The line numbering is based on the 625 standard, the first field consisting of lines 51, 52, 53, 54, . . . 151, 152, 153, 154, etc. and the second field, which is interlaced with the first, consisting of lines 363, 364, 365, . . . 463, 464, 465, etc. Since the circuit to be described will be comparing the information on the first and second fields it is essential that these two fields occur on the same frame of film which means that the film movement must be correctly phased.

Figure 2:
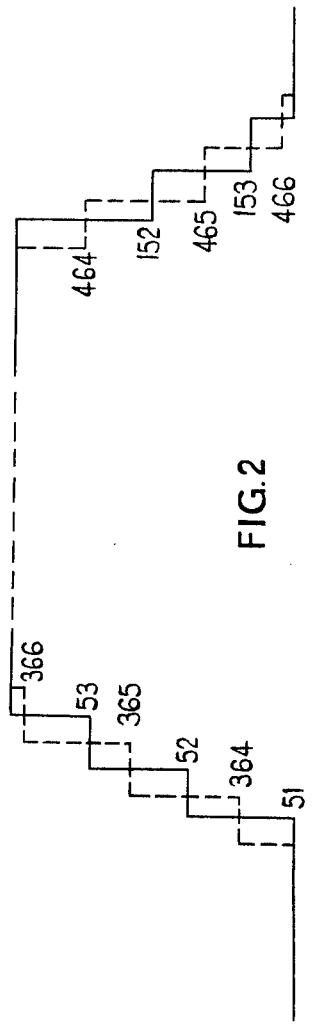
FIG. 2 shows the voltage waveform obtained for the two transitions.

FIG. 2 shows the voltage waveform obtained for the two transitions assuming they extend the full width of the picture. During the transitions, the voltage of line 51 of the first field is approximately equal to the mean voltage of the two immediately adjacent lines 363 and 364 of the second field. Similarly lines 53, 152, 153 in the first field carry voltages which are the means of the voltages of respective pairs of lines in the second field. Alternatively, single lines in the second field have voltages equal to the mean voltage of adjacent pairs of lines in the first field. Both FIG. 1 and FIG. 2 show the first and second fields with their correct registration.

If the first field were displaced downwards with respect to the film image being scanned, i.e. to the right in FIG. 1, then the voltage waveform for lines 51, 52 and 53 would be higher, and lower for lines 151, 152 and 153 in FIG. 2. Therefore if one were to subtract the mean amplitude of lines 363 and 364 from line 51, a positive output would be obtained, but if one were to subtract the mean amplitude of lines 463 and 464 from line 152 a negative output would be obtained. By detecting that line 464 has a lower amplitude than line 463 this negative output can be inverted to produce all positive outputs for a downward shift of the first field or negative outputs for an upward shift of the first field relative to the second.

Summarising, by comparing one line in either field with the immediately adjacent pair of lines in the other field a difference signal can be developed indicative of vertical mis-registration. Since in general vertical transitions do not extend the full width of the picture the mean voltage of the lines is used for the comparison. The comparison is effected for a plurality of lines so that, as mentioned above, the effect of signals arising solely from the pattern being scanned and not from vertical mis-registration are reduced.

Figure 3:
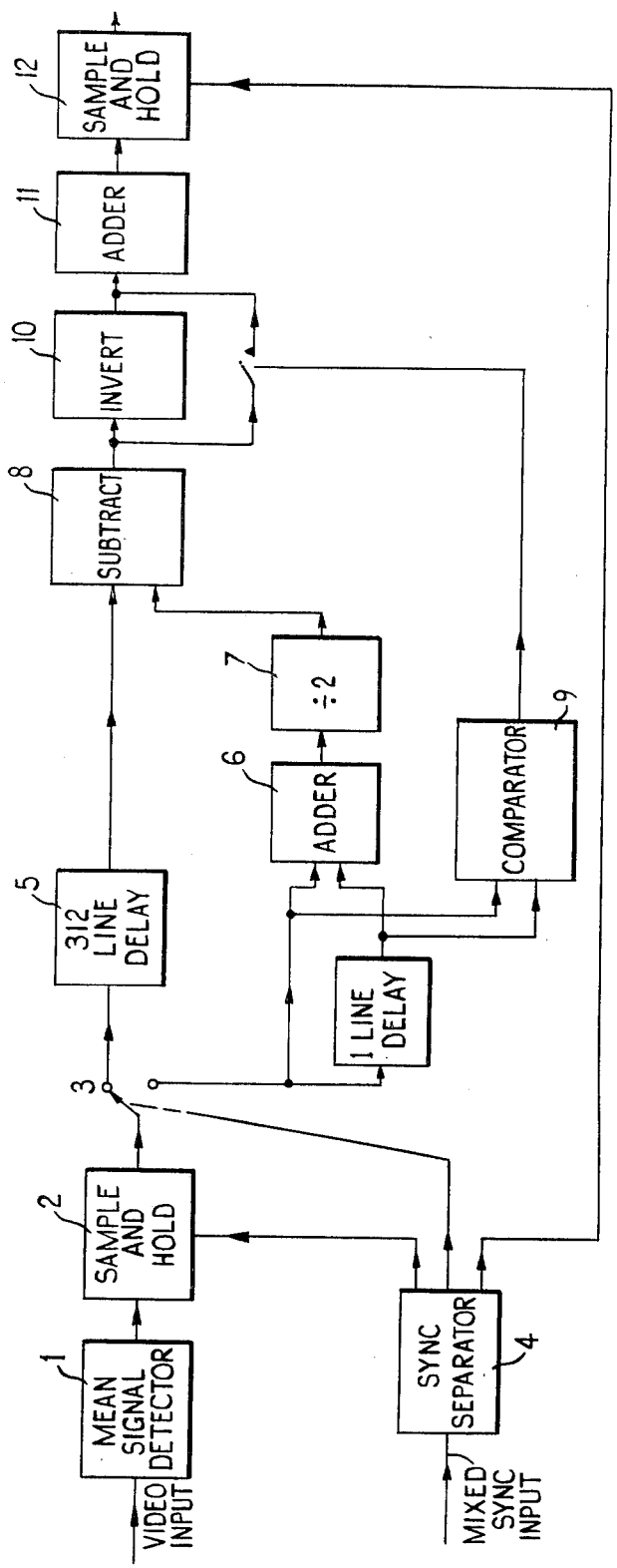
FIG. 3 is a block diagram of an embodiment of a circuit according to the invention.

FIG. 3 is a block diagram of a circuit which operates according to the above principles. The incoming video signal is mean detected at 1 to produce a signal proportional to the mean for one line only. This is stored in the sample and hold 2 while the mean detector 1 operates on the next line. For the first field the mean one line signals are coupled to a 312 delay 5 via the electronic switch 3. This switch is controlled by a sync separator 4 which determines the time of arrival of the first and second fields, and which also controls the sample and hold 2. The 312 line delay is applicable to the 625 system, the delay being adjusted according to the television standard.

For the second field, switch 3 is changed over and the adder 6 sums the mean signal for two consecutive lines in the second field, the divider 7 halves the amplitude of the sum signal, and the subtract stage 8 subtracts it from the intermediate line in the first field. The comparator 9 detects whether the vertical signal is increasing or decreasing and bypasses the inverter 10 or not as required to produce the difference signal with correct sign. The final adder 11 sums the difference signal computed for every line, the sum being stored in the sample and hold 12 until the next two fields have been completed and the new error stored.

The error signal once obtained can be used in several ways. Since with some picture information the error signal can disappear and the visual effect also, or the film may be stopped, it is desirable to store the error signal previously measured since it is unlikely that the drift from which the error signal was obtained has suddenly disappeared. The main application of this invention is to correct errors due to temperature drift and thus it will be necessary to store the error detected until information is received to change this error amplitude.

There are many forms of analogue and digital store which can be used, but it is preferable to use one which stores the error information even when the equipment is switched off for a short or long period. Such a store is a motor driven potentiometer, the motor being driven by the output from the sample and hold suitably amplified. When the error has reached near zero the motor will stop and the output from the potentiometer will hold constant.

I claim:

1. A circuit for providing an error signal indicative of vertical mis-registration in a flying spot scanner in which each film frame is scanned by at least two interlaced fields, the circuit comprising first means for forming in respect of each of a plurality of lines in one field, a signal representative of the difference between the mean video signal value of each said line and the mean video signal value of the respective two immediately adjacent lines in the other field, second means for selectively reversing the sign of each difference signal when a predetermined one of the two immediately adjacent lines has a greater individual mean video signal value than the other, and third means for forming the sum of the difference signals for the plurality of lines in the one field.

2. A circuit as claimed in claim 1, in which respective difference signals are formed in respect of all the lines in the one field.

3. A circuit as claimed in claim 1, wherein the first means includes averaging means for forming the mean video signal value of each line in each of the two fields, switching means for supplying the mean signal values of the lines of the one field to a first circuit path and the mean signal values of the lines of the other field to a second circuit path parallel to the first, further averaging means in the second circuit path for forming the mean of each mean signal value of the other field with the immediately following mean signal value of the same field, a delay circuit providing a delay of one field period in the circuit path corresponding to the earlier occurring of the two fields, and a subtraction circuit for forming the difference between the signals at the outputs of the two circuit paths.

4. A circuit as claimed in claim 3, wherein the second means comprises an inverter circuit which is selectively electrically interposed between, the first and third means in dependence upon the magnitude of each mean signal value in the second circuit path relative to the immediately following mean signal value.

5. A circuit as claimed in claim 1, further comprising a storage means for storing the sum of the difference signals.

6. A circuit as claimed in claim 5, wherein the storage means comprises a motor driven potentiometer.

* * * * *

UNITED STATES PATENT OFFICE
CERTIFICATE OF CORRECTION

PATENT NO. : 3,976,832

DATED : August 24, 1976

INVENTOR(S) : JOHN DAVID MILLWARD

It is certified that error appears in the above-identified patent and that said Letters Patent are hereby corrected as shown below:

[30] Foreign Application Priority Data

July 31, 1974    United Kingdom.......33694/74

Signed and Sealed this

Fifteenth Day of March 1977

[SEAL]

Attest:

RUTH C. MASON
Attesting Officer

C. MARSHALL DANN
Commissioner of Patents and Trademarks